Dec. 8, 1970   J. F. HURST ET AL   3,545,114
OPTICAL READOUT APPARATUS
Filed May 28, 1969   2 Sheets-Sheet 1
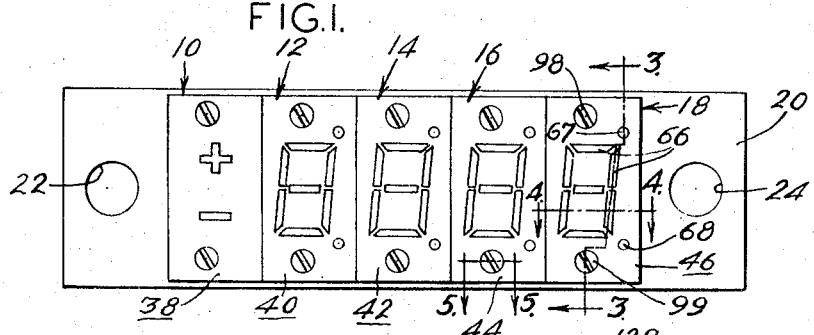
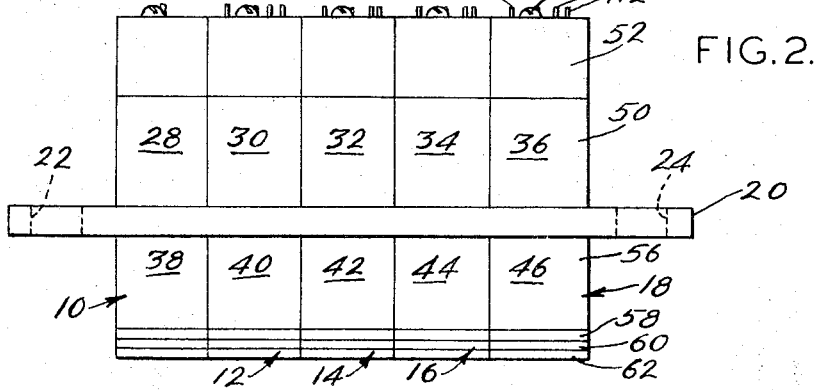
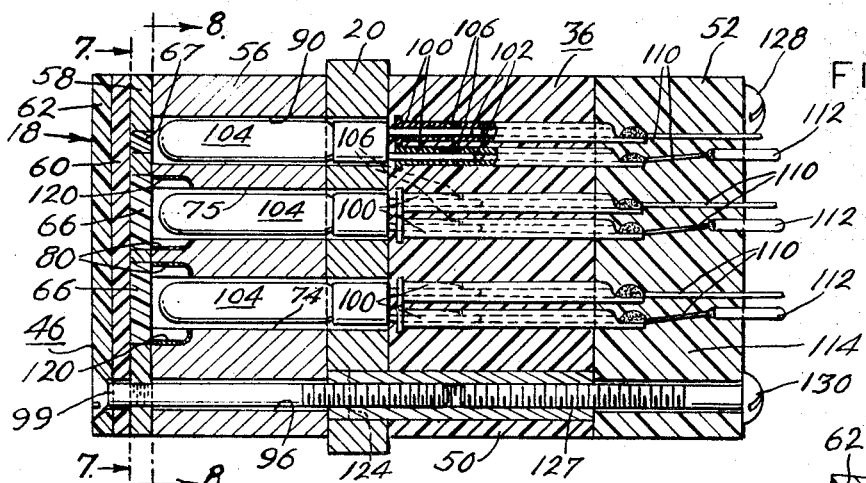
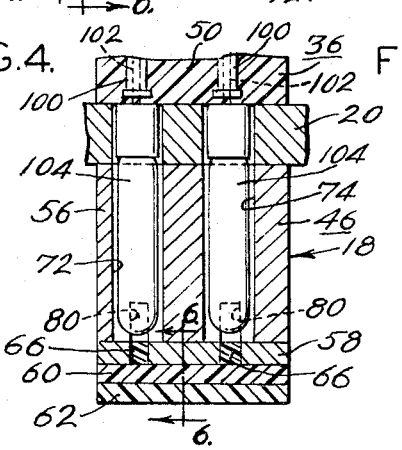
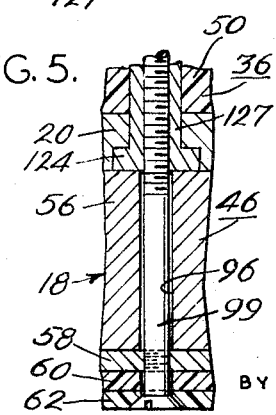
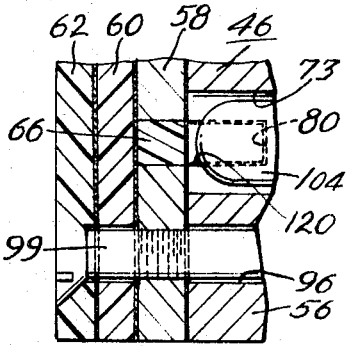
INVENTORS:
JOHN F. HURST
JOSEPH S. BODRI
BY Howson & Howson
ATTYS.

Dec. 8, 1970    J. F. HURST ETAL    3,545,114
OPTICAL READOUT APPARATUS
Filed May 28, 1969    2 Sheets-Sheet 2
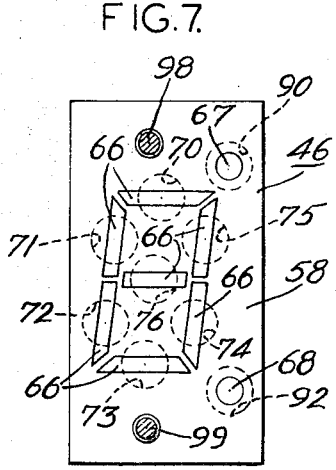
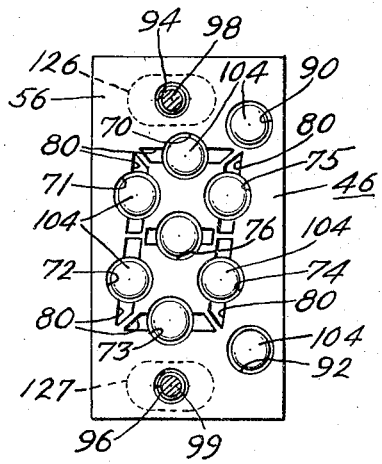
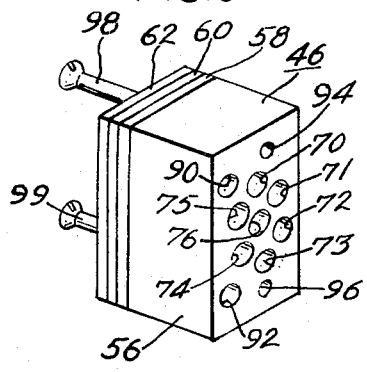
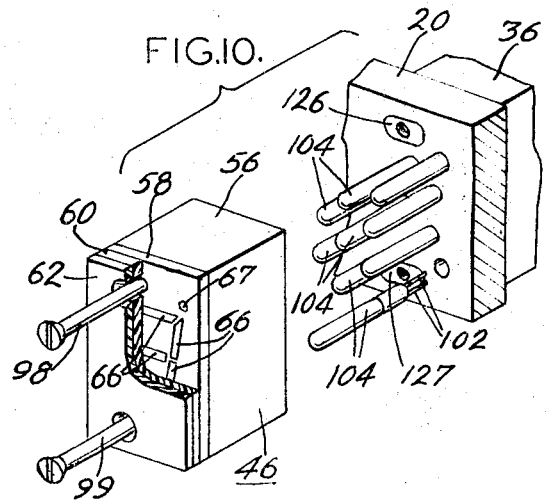
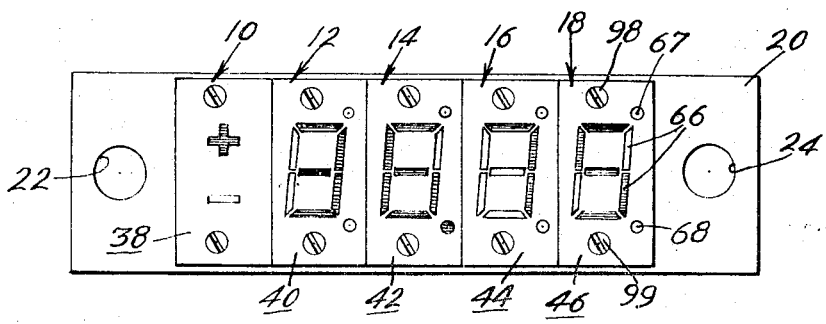
INVENTORS:
JOHN F. HURST
JOSEPH S. BODRI
BY
Howson & Howson
ATTYS.

United States Patent Office 3,545,114
Patented Dec. 8, 1970

3,545,114
OPTICAL READOUT APPARATUS
John F. Hurst, Audubon, and Joseph S. Bodri, Southampton, Pa., assignors to Oppenheimer, Inc., Willow Grove, Pa., a corporation of Pennsylvania
Filed May 28, 1969, Ser. No. 828,531
Int. Cl. G09f 13/00
U.S. Cl. 40—130
12 Claims

ABSTRACT OF THE DISCLOSURE

A modular optical read-out for alpha-numeric characters and symbols, preferably of the type in which numerals are displayed by means of seven separately-controllable lamps and seven corresponding translucent segments in a mask covering a lamp. Each character module comprises a rear socket assembly suitable for mounting on the rear of a supporting panel and contains seven pairs of lamp sockets into which the seven lamps can be plugged, and later unplugged, from the front of the panel by way of corresponding openings through the panel; the lamps protrude sufficiently through the front panel to permit their easy grasping for replacement purposes.

BACKGROUND OF INVENTION

This invention relates to apparatus for the optical display of information, and particularly to electrically-controlled character-readout apparatus.

There are many known applications in which it is desirable to present visually-readable, electrically-controllable characters or symbols such as alpha-numeric characters, arithmetic signs and other technical symbols. Such operation is often provided by apparatus commonly designated as an optical read-out display in which the electrical information is applied to an array of electrical lamps to control their brightness and in this way to present controllably the desired optical read-out of information.

In one form of such optical read-out apparatus with particular reference to which the present invention will be described, each lamp is associated with and positioned behind a separate translucent region in a mask so that when that lamp is turned on the translucent region will appear bright. Numerals are conveniently depicted by means of seven translucent segments per numeral, whereby any of the numerals from zero to nine may be depicted by turning on particular combinations of the lamps to illuminate corresponding combinations of the translucent segments. Other symbols and signs, such as degree marks, decimal points, plus and minus signs, etc. may be provided in each case by a translucent region corresponding in shape to the entire symbol, behind which translucent region one or more corresponding lamps are located. Such optical read-out displays are of particular utility in test equipment, navigational displays, communications displays, etc. for reading by an operator, and are commonly used for example in aircraft, naval ships and aerospace vehicles.

In such display apparatus it is desirable that the characters be displayed clearly and that the apparatus be compact, versatile, and easy to fabricate, install and maintain.

Accordingly it is an object of the invention to provide new and useful optical read-out apparatus.

Another object is to provide such apparatus which is compact.

A further object is to provide such apparatus which is easy to maintain.

Another object is to provide such apparatus which is mountable on a support and is such that the lamps can readily be replaced from the front of the support.

SUMMARY OF THE INVENTION

These and other objects of the invention are achieved by the provision of modular character-display apparatus comprising one or more modules each having a socket assembly mountable on the rear of a support panel for mounting and providing electrical connection to a plurality of electric lamps, the lamps extending through the panel and protruding from its front, each module also comprising an integral character-depicting front assembly detachably mountable on the front of said panel and having a plurality of translucent portions each corresponding to a different one of said lamps, and a heat sink element having a plurality of openings therethrough for exposing each of said translucent portions to light from a corresponding different one of the lamps, each of said openings being sufficiently large in cross-section to fit over the protruding portion of a corresponding one of said lamps, said character-depicting element being secured to said heat sink to form an integral unit therewith when removed from said panel.

To relamp the module when one of its lamps fails, the front assembly is detached from the panel and slipped off from the protruding ends of the lamp, the defective lamp grasped and unplugged from the front of the panel, a new lamp installed, and the front assembly replaced.

Where a plurality of non-circular translucent segments are used to depict an alpha-numeric character, each opening in the heat sink preferably is a bore of circular cross-section smaller in diameter than the largest dimension of the corresponding translucent portion, and is enlarged at the end adjacent the character-depicting element so as to encompass said largest dimension, whereby the entire translucent portion is illuminated to provide bright clear display of the character. Preferably also the enlarged portion of the opening is coated with a light-reflective substance, e.g. a white paint, to enhance brightness.

Preferably also, each module is provided with parallel lateral surfaces so a plurality of such modules may readily be mounted side-by-side in close proximity to depict a multi-digit number, for example.

According to another preferred feature, each socket assembly is also detachably mountable on the panel, whereby a complete modular unit is provided for each character, providing versatility in the display of any selected number of characters as required for the particular application.

According to a further preferred feature, each front assembly comprises one or more laminar optical elements bonded thereto for modifying the light from the display, for example to color it or polarize it.

BRIEF DESCRIPTION OF FIGURES

These and other objects and features of the invention will be more readily appreciated from a consideration of the following detailed description, taken in connection with the accompanying drawings, in which:

FIG. 1 is a front view of optical display apparatus constructed in accordance with the invention in one of its preferred forms;

FIG. 2 is a top view of the apparatus of FIG. 1;

FIG. 3 is a sectional view taken along lines 3—3 of FIG. 1;

FIG. 4 is a sectional view taken along lines 4—4 of FIG. 1;

FIG. 5 is a sectional view taken along lines 5—5 of FIG. 1;

FIG. 6 is a fragmentary sectional view taken along lines 6—6 of FIG. 4;

FIG. 7 is a view taken along lines 7—7 of FIG. 3 showing one of the modular elements of the optical display apparatus;

FIG. 8 is a view taken along lines 8—8 of FIG. 3 showing the front of a heat sink element of one of the modules of the assembly of FIG. 1;

FIG. 9 is a perspective view of one of the modular front assemblies of the apparatus shown in FIG. 2, as viewed from the rear side thereof;

FIG. 10 is a perspective view of one of the modules of the apparatus shown in FIG. 1 with the front assembly separated; and FIG. 11 is a view of the apparatus of FIG. 1 with various translucent portions illuminated to display typical information.

DESCRIPTION OF SPECIFIC EMBODIMENTS

Referring now to the particular embodiments of the invention shown in detail in the drawings by way of example, only, FIGS. 1 and 2 illustrate an assembly of five character-depicting modules 10, 12, 14, 16 and 18, each of parallelopiped form, mounted immediately adjacent each other on a common supporting panel 20. The panel 20 is conveniently provided with a pair of mounting holes 22 and 24 at its opposite ends for mounting the entire assembly on a frame or instrument, for example. Module 10 is adapted to depict either a plus or minus sign, while each of modules 12, 14, 16 and 18 is adapted to depict any numeral from zero to nine inclusive. Modules 10, 12, 14, 16 and 18 include, respectively, separately mountable rear socket assemblies 28, 30, 32, 34 and 36, and separately mountable front assemblies 38, 40, 42, 44, and 46.

Referring now to the representative module 18 as shown in more detail in FIGS. 3–10, the rear socket assembly 36 comprises a socket portion 50 and a connector portion 52. Front assembly 46 comprises a heat sink 56, a character-depicting element 58, a color filter 60 and a polarizing filter 62.

Considering first in more detail the front assembly 46, the character-depicting element 58 is in the form of a rectangular lamina or wafer of a generally opaque material such as plastic or metal, having seven translucent segments such as 66 arranged in the form of a slanted, straight-sided figure-eight, and two circular translucent portions 67 and 68. Each translucent segment is spaced from the others, so that each may be separately illuminated from the rear. While there are many ways of making such a character-depicting element, one preferred procedure is to start with an imperforate rectangular blank held in an appropriate jig, and machine or stamp it according to a predetermined pattern so that apertures are produced through the blank in the form of the desired segments. The apertures may then be filled with an appropriate transparent, hard, plastic material, as by placing the blank on a flat surface, filling the apertures with the plastic in liquid form, wiping off the excess and allowing the plastic to harden. A convenient material for the character-depicting element 58 is aluminum.

The heat sink 56 in this example comprises a rectangular block of heat-conductive material such as aluminum provided with 11 longitudinal bores therethrough. Seven of these bores, shown particularly clearly in FIGS. 8 and 9, and designated by the numerals 70 through 76, comprise the lamp-receiving and light-transmitting bores, each aligned approximately with the center of a different one of the translucent segments 66. In this example the portion of each such bore extending from the rear face of the heat sink toward the front of the heat sink is of a circular cross section larger than the width of the corresponding translucent segment but smaller than the length thereof. Such bores may be formed by drilling entirely through the heat sink. Each bore is also large enough to fit loosely around the exterior of the corresponding lamp, as described hereinafter.

Each of the bores 70–76 is enlarged at its outer end adjacent the character-depicting element 58, to provide a corresponding slot-like recess such as 80 having a shape substantially congruent with the adjacent associated translucent segment 66 in the character-depicting element. The recesses such as 80 are conveniently formed by applying to the front face of the heat sink the same machining or stamping operation which was utilized to form the translucent segments.

The two circular translucent portions 67 and 68 are located near the upper right-hand corner and the lower right-hand corner, respectively, of the character-depicting element, and again may be formed by suitable boring and filling with plastic material. The translucent portion 67 provides for display of a degree sign, and the translucent portion 68 provides for display of a decimal point. Longitudinal bores 90 and 92, corresponding to and aligned with translucent portions 67 and 68 respectively, extend through heat sink 56. Bores 90 and 92 may each have a circular cross-section larger than that of the translucent regions 67 and 68, and need not be modified or enlarged at the front end. Bores 90 and 92 are also of sufficient cross-section to surround loosely the associated lamps to be received therein.

Color filter 60 and polarizing filter 62 may be plastic wafers of the same peripheral size and shape as the character-depicting element 58; for example, filter 60 may be a red filter, in which case the visual information will be displayed in red, with glare effects minimized by the presence of the polarizing filter 62.

The heat sink 56, the character-depicting element 58, the color filter 60 and the polarizing filter 62 are bonded together in alignment with each other, preferably by cementing them together with small amounts of a suitable transparent plastic adhesive, thereby to form an integral front assembly. In order to provide for mounting of the complete front assembly on the supporting panel 20, a pair of bores 94 and 96 are provided which extend longitudinally through the complete front assembly, outside the area of information display, and receive a pair of captive flat-head screws 98 and 99 respectively. Each of screws 98, 99 is threaded near its end but has a portion free of threads near its head. Each of bores 94, 96 is provided with internal threading in the character-depicting element 58, while the portions of the bores which pass through the heat sink and the color and polarizing filters are of sufficient diameter to clear the screw surfaces. Accordingly, the threads in the character-depicting element permit the screws to be initially inserted in position by screwing them through the character-depicting element, and serve to hold the screws captive thereafter. Appropriate counter-sinking for the heads of the screws is preferably provided in the polarizing filter 62 so as to produce a flush front surface for the assembly. Each of the screws is of sufficient length to extend entirely through the front assembly 46 and well beyond, so as to enable mounting of the front assembly on panel 20, as will be described hereinafter.

Referring now to the rear assembly 36, nine pairs of plug-in lamp sockets such as 100 are provided therein, each pair adapted to receive, support, and provide separate electrical contact to, corresponding pairs of connector pins such as 102 of the nine generally-tubular electric lamps such as 104. To this end, the socket portion 50 of rear assembly 36 may comprise a plastic block of parallelopiped form in which the sockets 100 are mounted. Preferably each socket is of generally tubular form, and of a springy material whereby a bent-in-tab such as 106 on each socket assures frictional and electrical contact to the corresponding lamp pin.

In the embodiment shown, each tubular socket extends rearwardly beyond the rear edge of the socket portion of the rear assembly, and is there crimped or modified to form a soldering lug for enabling soldered connection thereto. In the embodiment shown, a separate wire such as 110 is soldered to the soldering lug of each of the sockets; one such wire from each pair of associated sockets is brought to the exterior of the unit, and the other is connected to a pin such as 112. The connecting wires and the pins may be held in suitable fixed position by potting in a plastic block 114 having the same general form as the socket portion 50. The arrangement of the pins such as 112 may be such as to mate with a corresponding external unitary connector, and the wires such as 110 may be connected together to provide a common ground for the lamps. It will be understood that the connector portion of the rear assembly may take any of a large variety of different forms, and may for example provide output electrical connection in the form of separate wires for each socket, separate solder lugs for each socket, or a printed-circuit arrangement providing connection to the sockets and providing for external connection thereto. In the present example it will be assumed that the leads such as 110 are connected together and to a common or ground reference-potential, and each of the pins 112 is supplied with a controllable voltage with respect to the reference potential, whereby the corresponding lamp can be turned on or off at will.

The dimensions of the apparatus and the lengths of the plug-in lamps such as 104 are preferably such that the forward end of each of the seven lamps 104, when the front assembly is in position on the supporting panel, extends forwardly into the corresponding recess such as 80, but not so far as the front edge of the heat sink 56. Preferably the inner surfaces of each of the recesses such as 80 is highly light-reflective, as may be provided by applying thereto a thin coating, such as 120, of a light reflective substance, preferably a white paint. In this way the recess acts as a light reflector and diffusor for spreading-out the illumination from each lamp so that substantially uniform illumination of all portions of the corresponding translucent segment is provided. If desired, uniformity of illumination and reduction of glare may be further enhanced by a fine roughening of the surfaces of the plastic in the translucent portions of the character-depicting element, such as may be provided by sand blasting for example.

To enable mounting of both the front assembly 46 and the rear assembly 36 on the supporting panel 20, a pair of internally-threaded inserts 126 and 127 are provided which extend through the supporting panel 20 and the socket portion of the rear socket assembly 36, and each of which is provided with a generally rectangular transverse head such as 124 fitting into a corresponding recess in the front of panel 20. The inserts extend rearwardly through corresponding bores in the socket portion 50. Once placed in position, inserts 126 and 127 are prevented from rotating by the heads 124. A pair of mounting screws 128 and 130 extend from the rear of the rear assembly, through a corresponding pair of clearance bores in the connector portion 52, and engage the threads in the rearward ends of the inserts 126 and 127, thereby mounting the rear assembly on the supporting panel 20. The same two inserts 126 and 127 receive the threaded ends of the mounting screws 98 and 99 for mounting the front assembly 46.

Accordingly, by loosening the front assembly mounting screws 98 and 99, the front assembly may be removed from the panel as illustrated in FIG. 10, with the mounting screws held captive by the threads in the character-depicting element 58, thereby to expose the lamps for easy replacement merely by pulling out a defective one and plugging in a new lamp. The rear assembly can be demounted by unscrewing the mounting screws 128 and 130 and with drawing the rear assembly from about the threaded inserts 126 and 127.

FIG. 11 illustrates how the number 36.75 may be displayed by suitable control of the voltages applied to those lamps controlling the illumination of the segments defining this number, in the complete assembly of modules illustrated in FIG. 1. The heavily-shaded segments represent those which are illuminated. If the number is one representing degrees, the degree sign of module 18 may be illuminated by turning on of the appropriate lamp. Module 10 contains the plus and minus signs, and in FIG. 11 is shown with the plus sign illuminated. Although separate special modules may be provided for such differing symbols, it is also possible in many cases, and particularly in the case of the plus or minus signs, to utilize the same type of modules as is used for the numeral depiction, appropriately modified so that the translucent portions in the character-depicting element define the plus or minus signs, which are located so as to receive light from one or more lamps in the bores in the corresponding heat sink, appropriate channeling of recesses in the front of the heat sink being provided to enable sufficiently uniform illumination of the particular symbol.

Accordingly it will be appreciated that there has been provided a module, and a modular assembly, of optical display apparatus in which defective lamps may readily be replaced from the front of a supporting panel by simple detachment and removal of a front assembly module to expose protruding ends of the lamps, which may readily be replaced manually. The parallel lateral sides of the modules enable convenient application to display of any number of digits or sets of symbols in a highly compact arrangement, whereby only a small size and volume are required. As contrasted to so-called Nixie displays, the visual display is presented in a single plane, and adequate provisions for heat removal, coloration and/or polarization of the light are also made. The provision of recesses in the heat sink immediately adjacent the translucent sections of the character depicting element assure that, while light from only one lamp reaches the corresponding segment, that segment is uniformly and brightly illuminated.

It will be understood that the principles of the invention may be applied in many different ways. By way of example only, vastly different types and shapes of translucent segments, of numerals and of symbols may be employed. The optical light-modifying elements, such as the color filter and polarizing filter may be omitted, or other elements used in place of, or addition to, them. Other arrangements for bonding together the front assembly, and for mounting the front assembly and the rear assembly, may also be employed.

Thus while the invention has been described in the interest of complete definiteness with particular reference to specific embodiments thereof, it will be understood that it may be embodied in a variety of forms diverse from those specifically exemplified without departing from the invention as defined by the claims.

What is claimed is:
1. In optical display apparatus:
    a support;
    a plurality of separately-detachable similar modular character-depicting front assemblies mounted on the front of said support adjacent each other;
    a plurality of similar modular lamp-supporting assemblies mounted on the rear of said support, each in alignment with a different one of said front assemblies and each containing a plurality of lamp-connecting means and a plurality of lamps removably mounted in corresponding different ones of said lamp-connecting means;
    each of said lamps extending through and protruding frontwardly from said support for easy removal from the front of said support when the corresponding one of said front assemblies is detached from said support;
    each of said front assemblies comprising: a character-depicting element having a plurality of translucent portions for displaying a character; a heat sink element between said character-depicting element and said support and containing separate openings therethrough, one for each of said lamps in the cor- responding socket assembly, into which openings the frontwardly-protruding portions of different ones of said lamps extend, so as to permit light from each of said lamps to illuminate selectively a corresponding different one of said translucent portions by way of the corresponding opening; and means bonding together said character-depicting element and said heat sink element, thereby to hold them together as a unit when removed from said support and to facilitate their detachment from and subsequent attachment to said support during lamp-replacement operations.

2. The apparatus of claim 1, in which each of said openings in each said heat sink is circular in cross-section over a major portion of its length and smaller in diameter than the largest lateral dimension of the corresponding one of said translucent portions, and in which said each opening has an enlarged portion at the end thereof adjacent said character-depicting element, said enlarged portion being of a size and position to encompass substantially completely said largest lateral dimension.

3. The apparatus of claim 1, in which the surface of said enlarged portion of said each opening is coated with a light-reflective material.

4. The apparatus of claim 1, in which said coating is substantially white in color.

5. In optical display apparatus:
a support;
a plurality of separately-detachable similar modular character-depicting front assemblies mounted on the front of said support adjacent each other;
a plurality of similar separately-detachable modular socket assemblies mounted on the rear of said support, each in alignment with a different one of said front assemblies and each containing a plurality of pairs of lamp connections;
each of said socket assemblies containing a plurality of lamps each removably supported by, and electrically connected to, a different one of said pairs of lamp connections and extending through and protruding frontwardly from said support for easy removal from the front of said support when the corresponding one of said front assemblies is detached from said support;
each of said front assemblies being an integral unit comprising: a character-depicting element having a plurality of translucent portions for displaying a character, said translucent portions being exposed to light from corresponding different ones of said lamps; a heat-sink element between said character-depicting element and said support containing separate openings therethrough, one for each of said lamps in the corresponding socket assembly, into which openings the frontwardly-protruding portions of different ones of said lamps extend, so as to permit light from each of said lamps to reach a corresponding different one of said translucent portions by way of the corresponding opening; at least one optical element positioned to be impinged by light from said lamps passing through said character-depicting element, and to modify said light; and means bonding together said character-depicting element, said heat sink element, and said at least one optical element, thereby to hold them together as a unit when detached from said support and facilitate their detachment and subsequent attachment during lamp-replacement operations.

6. The apparatus of claim 5, in which each of said openings in each said heat sink is circular in cross-section over a major portion of its length and smaller in diameter than the largest dimension of the corresponding one of said translucent portions, and in which said each opening has an enlarged portion adjacent said character-depicting element which enlarged portion is of a size and position to encompass substantially completely said largest dimension.

7. The apparatus of claim 5, in which the surface of said enlarged portion of said each opening is coated with a light-reflective material.

8. The apparatus of claims 5, in which said coating is substantially white in color.

9. An optical character display module, comprising:
a socket assembly having a plurality of lamp-connecting means therein each providing electrical connection to a separate electric lamp protruding therefrom, and including means for mounting said assembly on the rear of a supporting panel, said lamps protruding from said lamp-connecting means sufficiently to extend through and beyond corresponding openings in said panel when said socket assembly is mounted on said panel;
character-depicting element comprising a plurality of translucent portions each corresponding to a different one of said lamps;
a heat sink element bonded to one side of said character-depicting element and having a plurality of bores therethrough aligned with different ones of said translucent portions, each of said bores being of sufficient diameter to receive that portion of a corresponding one of said lamps which extends through said panel; and
means for removably attaching said character-depicting element to said panel with said bores aligned with and surrounding the protruding portions of said lamps, the opposite lateral sides of said character-depicting element being parallel to each other.

10. The module of claim 9, in which each of said bores in said heat sink is circular in cross-section over a major portion of its length and smaller in diameter than the largest dimension of the corresponding one of said translucent portions, and in which said each opening has an enlarged portion adjacent said character-depicting element which enlarged portion is of a size and position to encompass substantially completely said largest dimension.

11. The module of claim 10, in which the surface of said enlarged portion of each said bore is coated with a light-reflective material.

12. The module of claim 11, in which said material is substantially white in color.

References Cited

UNITED STATES PATENTS

| | | | |
|---|---|---|---|
| 1,157,856 | 10/1915 | Eubank | 40—130X |
| 2,931,027 | 3/1960 | Blefary et al. | 40—130EX |
| 3,210,876 | 10/1965 | Towne | 40—130E |
| 3,354,565 | 11/1967 | Emmons | 40—130 |
| 3,481,062 | 12/1969 | DuBois | 40—130E |

JEROME SCHNALL, Primary Examiner

W. J. CONTRERAS, Assistant Examiner